US010246942B2

(12) United States Patent
Driver

(10) Patent No.: US 10,246,942 B2
(45) Date of Patent: Apr. 2, 2019

(54) HYRAULIC MOTOR CIRCUIT

(71) Applicant: OILPATH HYDRAULICS PTY LTD, Edwardstown, South Australia (AU)

(72) Inventor: Peter John Driver, Edwardstown (AU)

(73) Assignee: OILPATH HYDRAULICS PTY LTD, South Australia (AU)

( * ) Notice: Subject to any disclaimer, the term of this patent is extended or adjusted under 35 U.S.C. 154(b) by 576 days.

(21) Appl. No.: 15/021,568

(22) PCT Filed: Sep. 15, 2014

(86) PCT No.: PCT/AU2014/000899
§ 371 (c)(1),
(2) Date: Mar. 11, 2016

(87) PCT Pub. No.: WO2015/035454
PCT Pub. Date: Mar. 19, 2015

(65) Prior Publication Data
US 2016/0237747 A1 Aug. 18, 2016

(30) Foreign Application Priority Data
Sep. 13, 2013 (AU) .................. 2013903537

(51) Int. Cl.
*F16H 61/448* (2010.01)
*E21B 7/02* (2006.01)
(Continued)

(52) U.S. Cl.
CPC ............... *E21B 7/022* (2013.01); *E21B 3/02* (2013.01); *E21B 7/027* (2013.01);
(Continued)

(58) Field of Classification Search
CPC ...... F15B 13/024; F15B 20/007; F15B 21/14; F16H 61/4017; F16H 61/444; F16H 61/448; E21B 7/022
See application file for complete search history.

(56) References Cited

U.S. PATENT DOCUMENTS

| 3,408,901 A | 11/1968 | Inhofer | |
|---|---|---|---|
| 3,977,101 A | 8/1976 | Ohms | |
| 4,481,770 A * | 11/1984 | Lohbauer | F15B 11/02 60/445 |

FOREIGN PATENT DOCUMENTS

| CN | 102747950 A | 10/2012 |
|---|---|---|
| DE | 4234034 A1 | 4/1994 |

(Continued)

OTHER PUBLICATIONS

English Translation of JP-2003148611.*
(Continued)

Primary Examiner — F Daniel Lopez
Assistant Examiner — Daniel S Collins
(74) Attorney, Agent, or Firm — Sheridan Ross PC

(57) ABSTRACT

A hydraulic motor circuit for driving an auger is disclosed. The circuit includes a hydraulic motor that receives oil from an oil supply via a supply line and returns oil to the oil supply via a return line. The circuit further includes a main stage pressure relief valve and a first pilot stage relief valve operable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor. A control valve is configured to block flow to the first pilot stage relief valve when pressure, in the supply line is greater than pressure in the return line. If pressure in the return line exceeds pressure (Continued)

in the supply line, the control valve shifts open and exposes the first pilot stage relief valve to pressure in the return line.

14 Claims, 10 Drawing Sheets

(51) Int. Cl.
*F16H 61/4026* (2010.01)
*E21B 3/02* (2006.01)
*F15B 11/024* (2006.01)
*E02F 3/06* (2006.01)
*E02F 9/22* (2006.01)

(52) U.S. Cl.
CPC ....... *F16H 61/4026* (2013.01); *F16H 61/448* (2013.01); *E02F 3/06* (2013.01); *E02F 9/2217* (2013.01); *F15B 11/024* (2013.01); *F15B 2211/88* (2013.01)

(56) References Cited

FOREIGN PATENT DOCUMENTS

JP          2003148611 A  *  5/2003
WO    WO 1992/004544 A1    3/1992

OTHER PUBLICATIONS

International Search Report and Written Opinion prepared by the Australian Patent Office dated Oct. 15, 2014, for International Application No. PCT/AU2014/000899.

* cited by examiner

PUMP AND VALVE CIRCUIT AS PER OIL SUPPLY

HYRAULIC MOTOR CIRCUIT

CROSS REFERENCE TO RELATED APPLICATIONS

This application is a national stage application under 35 U.S.C. 371 and claims the benefit of PCT Application No. PCT/AU2014/000899 having an international filing date of 15 Sep. 2014, which designated the United States, which PCT application claimed the benefit of Australian Patent Application No. 2013903537 filed 13 Sep. 2013, the disclosures of each of which are incorporated herein by reference in their entirety.

PRIORITY DOCUMENTS

The present application claims priority from Australian Provisional Patent Application No. 2013903537 titled "HYDRAULIC MOTOR CIRCUIT" and filed on 13 Sep. 2013, the content of which is hereby incorporated by reference in its entirety.

TECHNICAL FIELD

The present disclosure relates generally to hydraulic motor circuits. More particularly the present disclosure relates to a hydraulic motor circuit for driving a drilling device such as an auger, grinder or cutter.

BACKGROUND

An auger is a drilling device used in construction to dig holes in the ground for structures such as posts, columns and foundation piles. An auger may be attached to a mobile excavator such as a tractor or a specifically designed drilling rig. An auger is typically driven by a drive mechanism that includes a hydraulic motor and gearbox.

During a drilling cycle, an auger rotates and removes material from the hole being drilled. The auger is then lifted out of the hole and flicked between forward and reverse rotation in order to dislodge the drillings (e.g. earth, rock). The auger is then put back down the hole and into steady rotation to remove further material. When drilling foundations it is common for the auger to come into contact with rock or other hard materials that can either stop the rotation or cause vibration and intermittent loading on the drive mechanism. This can create excessive loading on the gears and motor.

Furthermore, if the auger is stopped or reversed abruptly, the drill will exert a high inertia load on the drilling mechanism. If these inertia loads are not controlled, the hydraulic motor may overrun and cause damage to the drive mechanism.

It would be desirable to absorb shock loading from the drilling operation and inertia loads when the drilling mechanism is suddenly stopped or reversed without damage.

Other advantages of the present invention will become apparent from the following description, taken in connection with the accompanying drawings, wherein, by way of illustration and example, preferred embodiments of the present invention are disclosed.

SUMMARY

According to a first aspect, there is provided a hydraulic motor circuit for an auger, including:

a hydraulic motor that receives oil from an oil supply via a supply line and returns oil to the oil supply via a return line;

a main stage pressure relief valve;

a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor; and a control valve configured to block flow to the first pilot stage relief valve when pressure in the supply line is greater than pressure in the return line;

wherein, if pressure in the return line exceeds pressure in the supply line, the control valve shifts open and exposes the first pilot stage relief valve to pressure in the return line.

In one form, the control valve shifts open due to a pressure differential set up in the return line.

In one form, the control valve is a spool valve including an inlet and outlet, a pilot port and a spring chamber having a bias spring, said spring chamber directed to a further port, wherein the spool shifts open to allow flow between the inlet and outlet when pressure at the pilot port exceeds pressure at the further port which includes the bias spring pressure.

In one form, oil in the return line flows through a spring-biased blocking valve wherein a first flow pressure upstream of the blocking valve is communicated to the pilot port of the spool valve and a second flow pressure downstream of the blocking valve is communicated to the further port of the spool valve, the first flow pressure exceeding the second flow pressure by at least the value of the bias spring pressure of the spool valve.

In one form, the first pilot stage relief valve is set to open at a predetermined value selected from within the range 28 to 235 bar.

In one form, the circuit further includes a second pilot stage relief valve openable if pressure in the supply line exceeds a maximum working pressure, opening of the second pilot stage relief valve causing the main stage pressure relief valve to open, allowing flow to be diverted from the supply line to the return line.

In one form, the circuit further includes:

a first shuttle valve having a first inlet in fluid communication with the supply line, a second inlet in fluid communication with the return line and an outlet directing flow to the further port of the spool valve; and a second shuttle valve having a first inlet in fluid communication with the supply line, a second inlet in fluid communication with the return line and an outlet directing flow to the pilot port of the spool valve;

wherein, when the pressure in the supply line exceeds the pressure in the return line, the first and second shuttle valves are connected to the supply line and the spool valve remains closed whereas when the pressure in the return line exceeds the pressure in the supply line, the first and second shuttle valves connect to the return line thereby causing the spool valve to shift open.

In one form, the spool valve allows the circuit to switch between monitoring maximum working pressure in the supply line and inertia resistance pressure in the return line.

In one form, the second pilot stage relief valve is set to open at 240 bar.

In one form, the hydraulic motor is bi-directional.

In one form, the circuit is adapted for use with either an open or closed centre hydraulic system associated with equipment that the auger is attached to.

In one form, the circuit further includes:
a first solenoid valve having a 12V DC coil; and
a second solenoid valve having a 24V DC coil;
wherein, the first or second solenoid valves are remotely actuated by applying either 12V DC or 24V DC to the respective coils, the actuation of either valve causing the speed of the hydraulic motor to change from a first speed to a second speed.

According to a second aspect, there is provided a hydraulic motor circuit for driving an auger, including:
a bi-directional hydraulic motor that receives oil from an oil supply via a supply line and returns oil to the oil supply via a return line;
a main stage pressure relief valve;
a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor;
a second pilot stage relief valve openable if pressure in the supply line exceeds a maximum working pressure, opening of the second pilot stage relief valve causing the main stage pressure relief valve to open, allowing flow to be diverted from the supply line to the return line; and
a spool valve configured to block flow to the first pilot stage relief valve when pressure in the supply line is greater than pressure in the return line,
wherein, a pressure differential set up in the return line is used to open the spool valve when pressure in the return line exceeds pressure in the supply line thereby exposing the first pilot stage relief valve to pressure in the return line and enabling an inertia load acting on the motor to be absorbed.

According to a third aspect, there is provided a drilling apparatus, including:
an auger for performing a drilling operation; and
a hydraulic motor circuit for driving said auger, said circuit adapted for use with either an open or closed centre hydraulic system associated with equipment that the auger is attached to, the hydraulic motor circuit including:
a hydraulic motor that receives oil from the hydraulic system via a supply line and returns oil to the hydraulic system via a return line;
a main stage pressure relief valve;
a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor; and
a control valve configured to block flow to the first pilot stage relief valve when pressure in the supply line is greater than pressure in the return line;
wherein, if pressure in the return line exceeds pressure in the supply line, the control valve shifts open and exposes the first pilot stage relief valve to pressure in the return line.

BRIEF DESCRIPTION OF DRAWINGS

Embodiments of the present invention will be discussed with reference to the accompanying drawings wherein.

DESCRIPTION OF FIGURES

Figure 1:
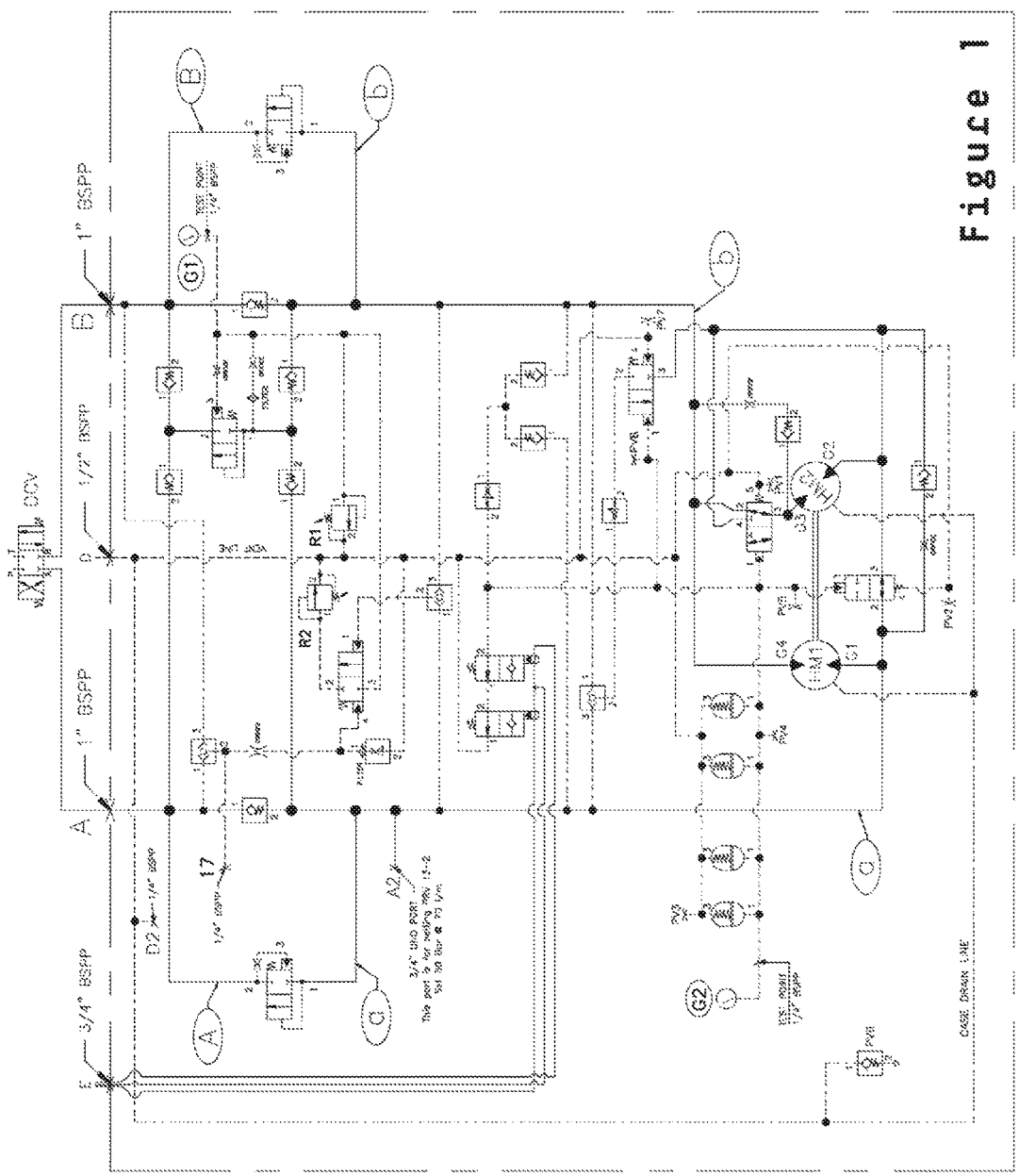
FIG. 1 is a hydraulic motor circuit for an auger providing means to absorb an inertia load acting on a hydraulic motor when the motor is shutdown or put into reverse.

Referring now to FIG. 1, there is shown a hydraulic motor circuit used to drive a drilling apparatus such as an auger. FIG. 1 is an overall circuit layout of the system. The valves used in the hydraulic motor circuit are off-the-shelf cartridge valves (e.g. valves supplied by HydraForce, Inc.). The hydraulic motor circuit receives oil supply from the hydraulic system installed on the equipment the auger is attached to such as a tractor, mobile excavator or other portable machinery. The hydraulic motor circuit is housed in a hydraulic manifold that has supply and return ports A, B and a drain port DL. The supply and return ports A, B are used to direct flow to the A or B side of the circuit as required in order to initiate forward or reverse rotation of the hydraulic motor.

The hydraulic motor is bi-directional (forward and reverse rotation) and in an exemplary example is a radial piston multi-stroke motor. The motor has inlet ports G1 and G2 and outlet ports G4 and G3. The hydraulic motor is capable of operating on half or all of its pistons. One half of the pistons are represented in the circuit as HM1 and the other half by HM2. The motor is capable of running at two speeds, a low speed used to provide maximum drilling torque and a high speed where a higher rotational speed is required for a given supply flow (e.g. to assist in removing the drillings on extraction or drilling at higher speeds). In low speed operation, the full displacement of the hydraulic motor is used and the pistons of HM1 and HM2 are both used (i.e. run in parallel). In high speed mode, only the pistons of HM1 are used, thereby reducing the motor displacement by 50% and doubling the rotational speed for a given supply flow. In high speed mode, hydraulic fluid is re-circulated around HM2. The low and high speed modes are controlled by remotely actuated solenoid valves in both 12V DC or 24V DC configurations. FIG. 1 shows that inlet port G1 and outlet port G4 are associated with HM1 while inlet port G2 and outlet port G3 are associated with HM2.

Directional control of the flow is enabled by a directional control valve (DCV) which is part of the hydraulic system of the portable machinery that the auger is attached to. The DCV shown throughout the figures is a 3-position 4-way DCV having a closed centre. An open centre control valve may also be used.

The hydraulic motor circuit provides maximum pressure relief from directions A to B and from B to A. The inertia forces acting on the motor are also controlled when the supply and return lines are suddenly closed during stopping or switched during reversal. The circuit is designed for a nominal flow of 150 l/m and maximum working pressure of 240 bar.

The hydraulic motor circuit is now described in further detail with reference to the description of symbols provided in Table 1 below. FIG. 1 provides detail of the orientation and position of each of the valves in the circuit.

TABLE 1

| | Description of symbols |
|---|---|
| A | Hydraulic Circuit side "A" |
| B | Hydraulic Circuit side "B" |
| DL | Drain Line Circuit |
| G1 | Test point connection for checking the two Pilot Pressure Relief Valves "R1" and "R2" |
| G2 | Test point connection for checking the Micro Circuit High and Low Speeds |
| HM1 | Part 1 of the Multi-Stroke Hydraulic Motor |
| HM2 | Part 2 of the Multi-Stroke Hydraulic Motor |
| PRV | Main Stage of the Pressure Relief Valves |
| R1 | Pilot Relief Valve used to set Maximum Pressure |
| R2 | Pilot Relief Valve used to set the Motor's Inertia Resistance in shut down mode |
| 1 | The Directional Control Valve that is mounted on the Machine supplying the Hydraulic Oil |
| 2 | Circuit Supply & Return Line "A". |
| 3 | Pilot line "B" to Low Side Load Shuttle Valve 5. |
| 4 | Drain Lines. |
| 5 | "A" and "B" Low Side Load Shuttle. |
| 6 | Pilot line "A" to Low Side Load Shuttle Valve 5. |
| 7 | Oil Supply and Return Coupling "A". |
| 8 | Drain Line Coupling "DL". |
| 9 | "A" side Oil return flow Logic Element (Bias Spring 160 Psi). |
| 9A | Metering Control Orifice. |
| 10 | "A" side Oil Supply flow Check Valve (Bias Spring 5 Psi). |
| 11 | Metering Control Orifice. |
| 12 | Inertia Absorbing Resistance. Pilot Relief Valve "R2". (Pressure adjustment range 410 to 3410 Psi/28 to 235 Bar). |
| 13 | Pilot supply line for Valve 12, Relief Valve "R2". |
| 14 | Two Way Directional Control Valve for switching the circuit from Maximum Load System Pressure to Inertia Absorbing Resistance Pressure (Bias Spring 110 Psi). |
| 15 | Pilot lines to Valve 14 and Valve 17. |
| 16 | Circuit line "A" (Oil Return Mode = High Side + 160 Psi). |
| 17 | Pressure Compensated Flow Regulator 0.4 l/m. |
| 17A | Pressure Compensated Flow Regulator Filter. |
| 18 | Port "A2" Oil Supply to set Relief Valve 12. |
| 19 | Pilot line "A" to High Side Load Shuttle Valve 23. |
| 21 | High and Low Mode, Micro Circuit Drain Line. |
| 22 | Pilot supply line to Valve 14. |
| 23 | "A" and "B" High Side Load Shuttle. |
| 25 | Pilot supply line for the High and Low Speed Micro Circuit. |
| 26 | Poppet Valve N.O. 24 Volts DC (Solenoid Valve) |
| 27 | Poppet Valve N.O. 12 Volts DC (Solenoid Valve) |
| 28 | Oil pilot line to Test Point 29. |
| 29 | Test Point for Gauge G2. |
| 30 | Electrical Supply Line + 12 Volts DC. |
| 31 | Electrical Return Line − 0 Volts DC. |
| 32 | Electrical Supply Line + 24 Volts DC. |
| 33 | Micro Circuit Cartridge Accumulators |
| 34 | Hydraulic Motor Section 1 "HM1" |
| 35 | Two Way Directional Control Valve to close Supply and Return line 16 and it switches the Motor from Low to High Speed Mode. (Bias Spring 170 Psi). |
| 36 | Hydraulic Motor Section 2 "HM2". |
| 37 | Oil drain lines from Valve 35 and Valve 38. |
| 38 | Three Way Directional Control Valve to close supply line 49 "HM2" and switch the Motor from Low to High Speed Mode. (Bias Spring 170 Psi). |
| 42 | Oil Circuit Line for Recirculating Oil in the High Speed Mode "HM2". |
| 45 | "B" Pilot Supply Line for Check Valve 48. |
| 46 | "A" Pilot Supply Line for Check Valve 47. |

TABLE 1-continued

| | Description of symbols |
|---|---|
| 47 | Micro Circuit Supply Check Valve "A" (Bias Spring 10 Psi). |
| 48 | Micro Circuit Supply Check Valve "B" (Bias Spring 10 Psi). |
| 49 | Circuit line "B" (Oil Return Mode = High Side + 160 Psi). |
| 50 | Oil pilot lines to Valve 52. |
| 51 | Pilot line "B" to High Side Load Shuttle Valve 23. |
| 52 | Pressure Compensated Flow Regulator 5.0 l/m. |
| 53 | Pilot Relief Valve "R1" that sets the Maximum Working Pressure (240 Bar/3500 Psi). |
| 54 | "A" Inlet Cheek Valve (Bias Spring 25 Psi). To Valve 71 Main Stage PRV. |
| 55 | Piloting Line to Valve 14. |
| 56 | Oil Supply Line from Valves 54 and 57 to Valve 71. |
| 57 | "B" Inlet Check Valve (Bias Spring 25 Psi). To Valve 71 Main Stage PRV. |
| 58 | Pilot Supply Line to Relief Valve "R1" Valve 53. |
| 59 | "B" Inlet line to PRV Check Valve 57. |
| 60 | "B" side Oil Supply flow Check Valve (Bias Spring 5 Psi). |
| 61 | "B" side Oil return flow Logic Element (Bias Spring 160 Psi). |
| 61B | Metering Control Orifice. |
| 62 | Test Point for Gauge G1. |
| 63 | Oil pilot line to Test Point 62. |
| 64 | Metering Control Orifice. |
| 64A | Orifice Filter. |
| 65 | Metering Control Orifice. |
| 66 | "B" Outlet from PRV Check Valve 68. |
| 67 | Oil Supply and Return Coupling "B". |
| 68 | "B" Outlet Check Valve (Bias Spring 25 Psi). From Valve 71 main stage PRV. |
| 69 | Circuit Supply & Return Line "B". |
| 70 | Oil Supply Line from Valve 71 to Valves 68 and 72. |
| 71 | Main Stage Pressure Relief Valve "PRV" Spool-Type Logic Element (Bias Spring 110 Psi). |
| 72 | "A" Outlet Chcek Valve (Bias Spring 25 Psi). From Valve 71 main stage PRV. |
| 73 | "A" Outlet from PRV Check Valve 72. |
| 74 | "A" Inlet line to PRV Check Valve 54. |
| 75 | "A" and "B" High Speed Load Monitoring Shuttle. |
| 76 | Load Monitoring Pressure Compensated Flow Regulator 5.0 l/m. |
| 77 | Two Way Directional Control Valve for switching the circuit from the low speed mode to high speed Load Monitoring (Bias Spring 110 Psi). |
| 78 | High Speed Back Pressure Load Monitoring Valve for "HM2 G3" (Check Valve Bias Spring 300 Psi). |
| 79 | Metering Control Orifice. |
| 80 | High Speed Back Pressure Load Monitoring Valve for "HM2 G2" (Cheek Valve Bias Spring 300 Psi). |
| 81 | Metering Control Orifice. |
| 82 | Purge Valve "PV1" for the removal of air during initial start-up. |
| 83 | Purge Valve "PV2" for the removal of air during initial start-up. |
| 84 | Purge Valve "PV3" for the removal of air during initial start-up. |
| 85 | Purge Valve "PV4" for the removal of air during initial start-up. |
| 86 | Purge Valve "PV5" for the removal of air during initial start-up. |
| 87 | Purge Valve "PV6" Sets the Maximum Drain Line Pressure (Bias Spring 725 Psi) and it is also used for the removal of air during initial start-up. |
| 88 | Purge Valve "PV7" for the removal of air during initial start-up. |
| 89 | Purge Valve "PV8" for the removal of air during initial start-up. |
| 90 | "P" Port for auxiliary control "17". |

Figure 2:
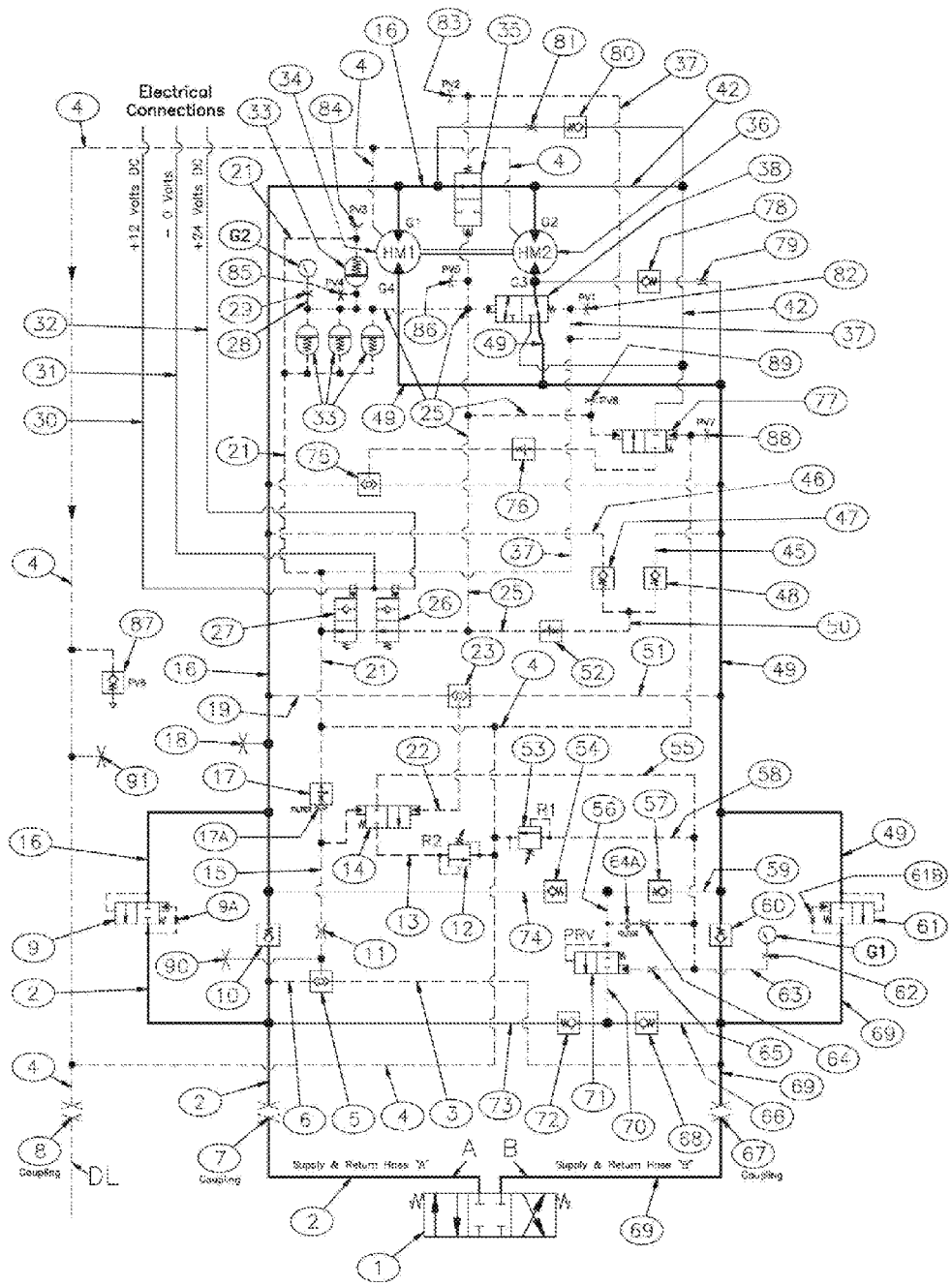
FIG. 2 shows the hydraulic motor circuit of FIG. 1 with circuit components numbered (as per the description of symbols in Table 1)

Referring to FIG. 2, supply and return hoses connected to the DCV of the portable machinery are coupled to the A and B ports of the hydraulic manifold through couplings 7, 67. A drain hose is coupled to the drain port through coupling 8. The main supply and return line A is shown at 2 while the main supply and return line B is shown at 69.

Figure 3:
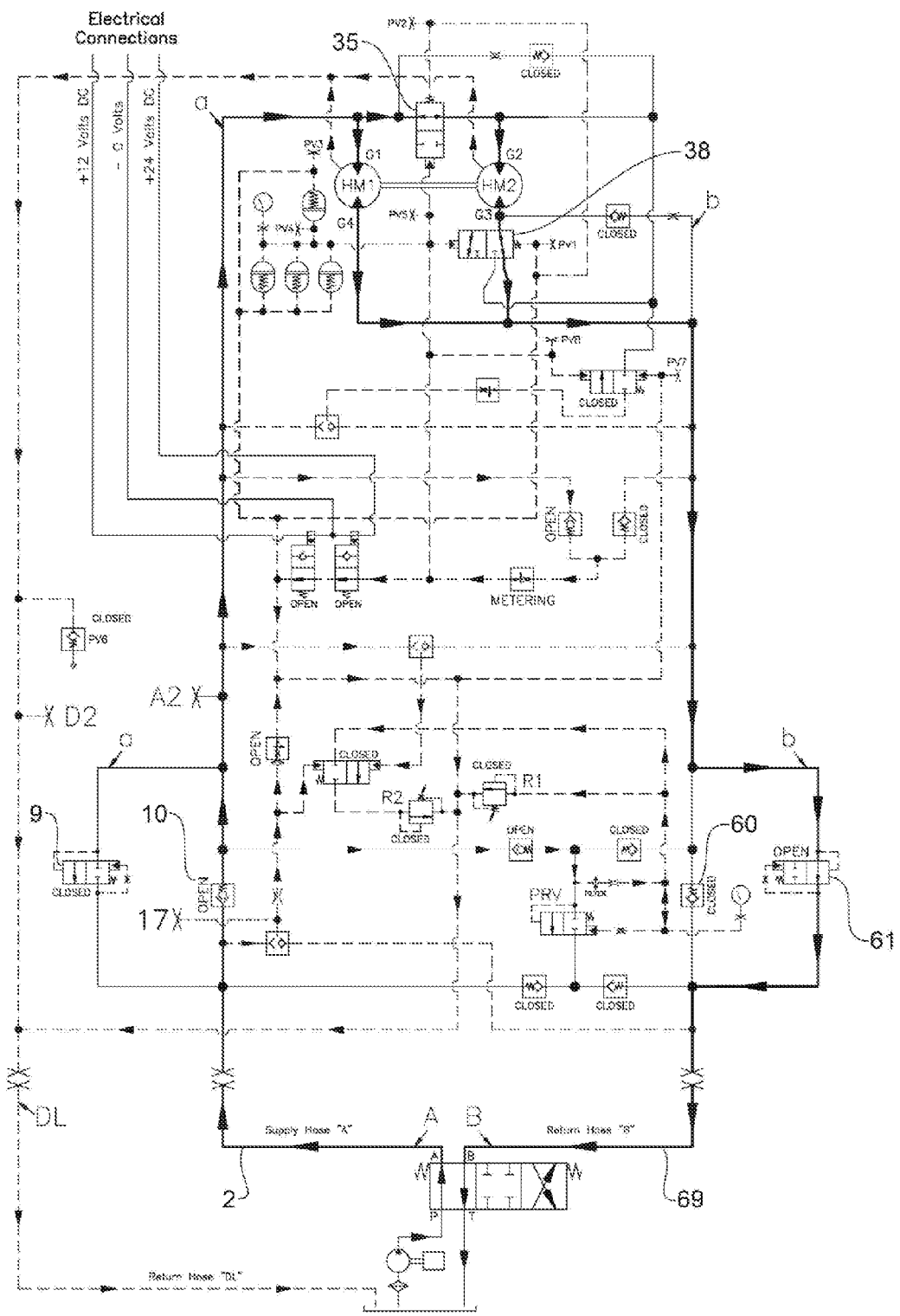
FIG. 3 shows the hydraulic motor circuit in low speed mode with HM1 and HM2 running in parallel.

Referring now to FIG. 3, the hydraulic motor circuit is shown running in low speed mode with the DCV directing flow to the A port (supply). Upon entering Port A of the manifold the flow will pass over check valve 10 which in one example has a bias spring (crack) pressure of 0.35 bar (5 psi). Check valve 10 blocks oil flow in the opposite direction. Half of the supply flow is directed to port G1 of HM1 which actuates half of the pistons in the hydraulic motor generating torque then exiting the motor at G4. The remaining 50% of the supply flow passes through spool valve 35 which is normally spring biased open, enters port G2 of HM2 and then exits at port G3 of HM2. The flow then passes through spool valve 38 which is normally spring biased (3-2) before recombining with the return oil from G4 of HM1 (other half of the pistons). The motor return flow then passes through logic valve 61 and exits the manifold through port B and is returned back to the hydraulic system of the machinery through the DCV. Check valve 60 blocks the returning flow and forces it through logic valve 61. Logic valve 61 is a spring biased closed blocking valve which opens once a bias spring force is overcome. In one example, the bias spring force may be 11 bar (160 psi).

Figure 4:
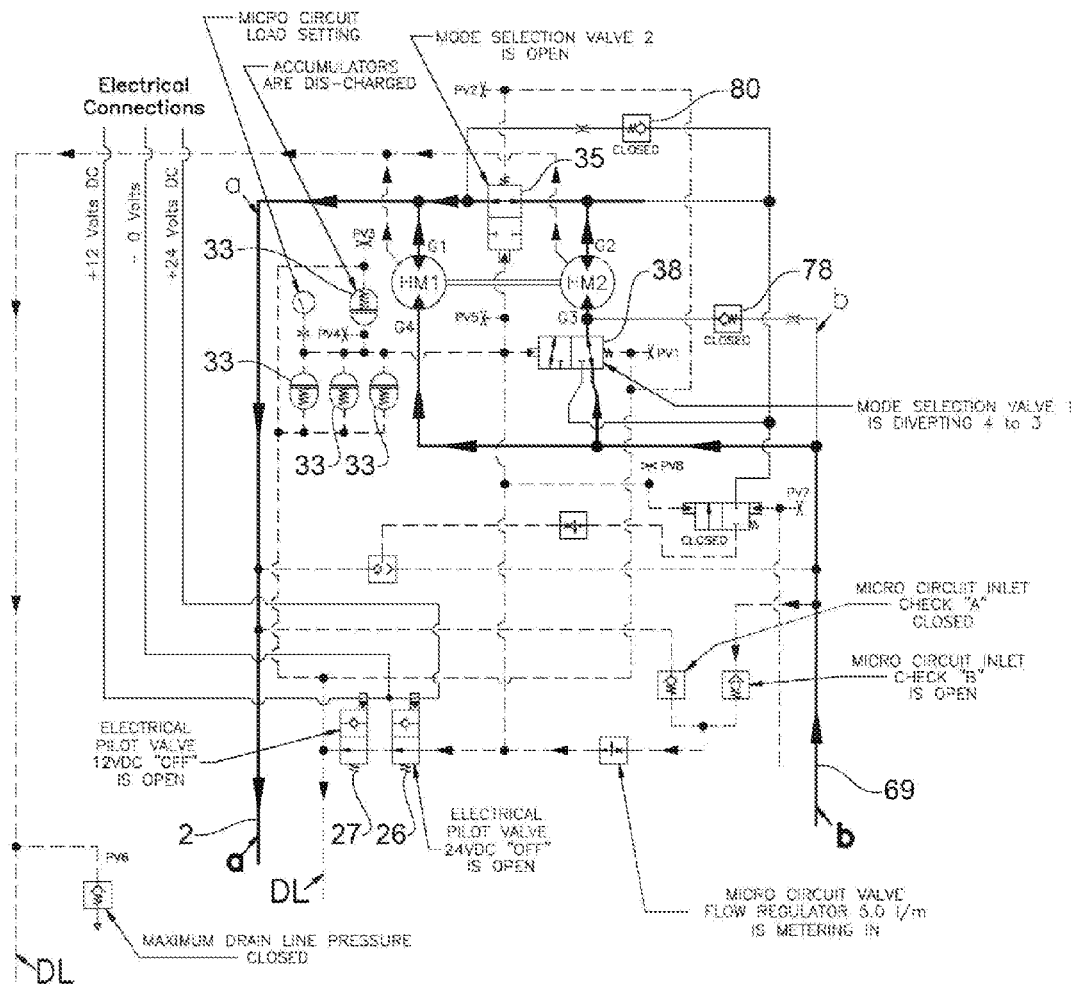
FIG. 4 shows a segment of the hydraulic motor circuit running in low speed mode with oil supply to the B port.

If hydraulic fluid is supplied through the B port (as shown in FIG. 4) then the B line 69 will be the main supply line and the A line 2 will be the main return line. If forward rotation of the auger is defined by supply to the A port then reverse rotation is defined by supply to the B port. Upon entering Port B of the manifold the flow passes over check valve 60 which has a bias spring (crack) pressure of 0.35 bar (5 psi). Check valve 60 blocks oil flow in the opposite direction. Half of the supply flow is directed to port G4 of HM1 which actuates half of the pistons in the hydraulic motor generating torque then exiting the motor at G1. The remaining 50% of the supply flow passes through spool valve 38 which is normally spring biased open to port G3 of HM2. After entering port G3, the flow will exit at port G2 of HM2 and then pass through spool valve 35 before recombining with the return flow from HM1. The motor return flow then passes through logic valve 9 and exits the manifold through port A and is returned back to the hydraulic system of the machinery through the DCV. Check valve 10 blocks the return flow and forces it through logic valve 9. Logic valve 9 is a spring biased blocking valve which opens once a bias spring force is overcome. In one example, the bias spring force may be 11 bar (160 psi).

Figure 5:
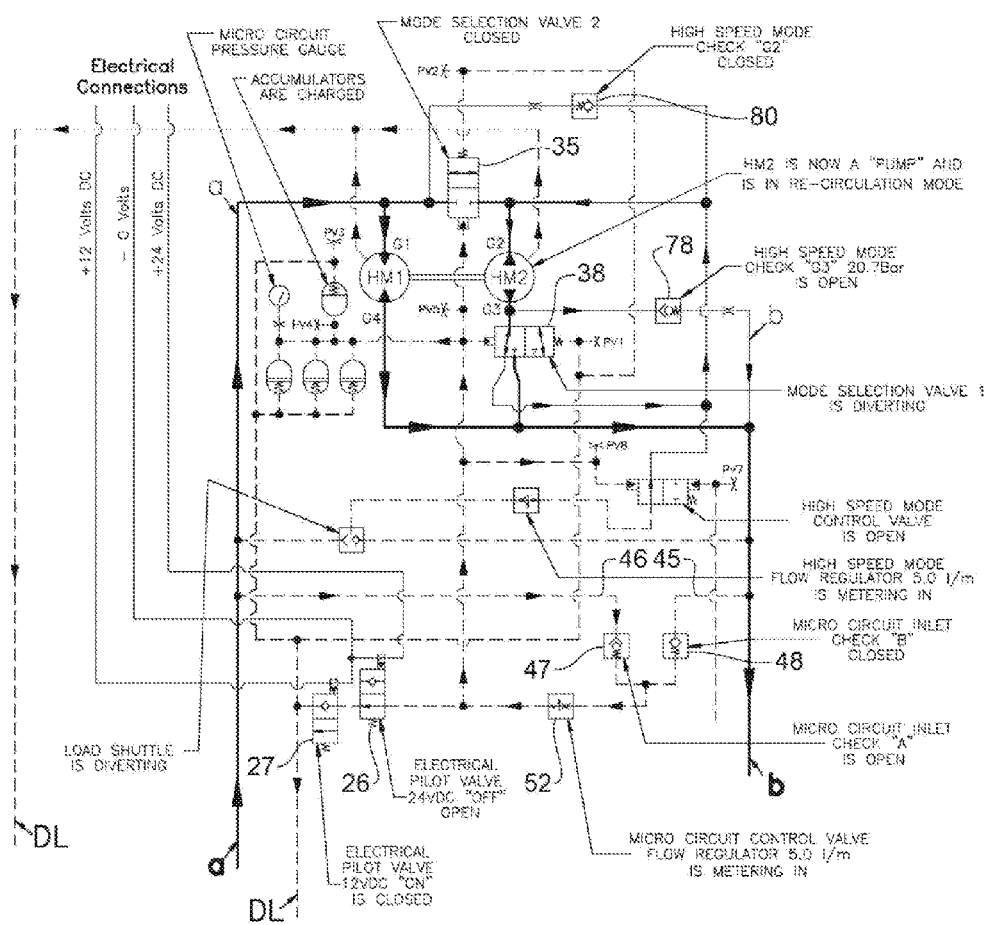
FIG. 5 shows a section of the hydraulic motor circuit running in high speed mode with HM1 running, HM2 in recirculation mode and oil supply to the A port.

In FIG. 5, a section of the hydraulic motor circuit is shown running in high speed mode with HM1 in operation, HM2 in re-circulation mode and oil supply to the A port. In high speed mode, only half of the pistons in the motor (i.e. HM1) are operatively connected to the circuit to generate torque. The motor displacement is therefore reduced by 50% and the rotational speed is doubled for a given supply flow. As shown in FIG. 5, supply flow from the A port enters port G of HM1, generates torque and exits via port G4. The motor return flow then passes through logic valve 61 and exits the manifold through port B and is returned back to the hydraulic system of the machinery through the DCV. In high speed mode, spool valve 35 is shifted to its piloted position thereby blocking the flow path between HM2 and the A supply line. Spool valve 38 is also shifted to its piloted position in high speed mode which blocks HM2 from the B return path in the manifold. Spool valve 38 connects port G2 of HM2 to port G3 of HM2 to form a closed re-circulating loop.

The hydraulic motor circuit is switched between low speed mode and high speed mode through solenoid valves 26 or 27 (which are poppet-type normally open valves). Solenoid valve 26 has a 24V DC coil, while solenoid valve 27 has a 12V DC coil. The operation of these solenoid valves is explained with reference to a pilot circuit (see for example pilot lines 45, 46) which supply pressure to check valves 47, 48. Check valve 47 connects the pilot circuit to the A flow path of the manifold while check valve 48 connects the pilot circuit to the B flow path. As the DCV is actuated to supply flow to either the A or B port of the manifold, simultaneously the pilot circuit is supplied pressure through either check valve 47 or 48 depending on the direction of flow in the circuit. The pilot flow is regulated to 0.4 l/m by a pressure compensated flow regulator valve 52. The purpose of flow regulator valve 52 is to limit the amount of flow consumed by the pilot circuit while ensuring adequate flow is provided for the piloting function.

In low speed mode (such as shown in FIG. 4), pilot oil flows through the solenoid valves 26, 27 and then returns to the reservoir associated with the hydraulic supply on the portable equipment through the drain passage in the manifold. When either solenoid valve 26 or 27 is remotely actuated (by applying 12V to the solenoid coil of valve 27 or 24V to the solenoid coil of valve 26) the respective valve is shifted closed which blocks the pilot flow from returning to the reservoir. Pressure then builds in the pilot circuit and once the pressure reaches 11.7 bar, accumulator cartridges 33 and spool valves 35 and 38 will simultaneously shift to their piloted position which puts HM2 into re-circulation mode and the hydraulic motor circuit into high speed mode.

Also shown in FIGS. 4 and 5 are accumulators 33 that are a spring energized cartridge valves, for maintaining the pilot circuit pressure during switching rotation from forward to reverse and reverse to forward, during operation of the high speed mode. Whenever the supply flow is interrupted by the DCV, the pilot pressure in the pilot circuit will decay quickly as a result of leakage around check valves 47, 48 and leakage through either solenoid valve 26, 27. Pilot pressure decay would cause the circuit to change from high speed mode back into low speed mode as spool valves 35, 38 shift open connecting HM2 to both the A supply and B return flow. The function of the accumulators is to prevent this from happening for a period of time. Each time the auger is put into high speed mode and the pressure in the pilot circuit increases above 16.5 bar, the pistons in the accumulator cartridges 33 begin to compress the springs. At full compression the four accumulators will provide a total of 12 cubic centimeters of extra oil volume in the pilot circuit. The springs provide stored energy that is used to maintain pressure in the pilot circuit. In the high speed mode, if direction of rotation of the auger is changed, the pilot circuit will begin to decay but as long as either solenoid remains energised, the drill will remain in the high speed mode until the accumulator 33 volume is exhausted as a result of leakage from the pilot circuit. It may take in excess of 20 minutes for the accumulator volume to be exhausted, thereby ensuring that a piloting pressure to the directional spool cartridges 35, 38 is maintained.

Figure 6:
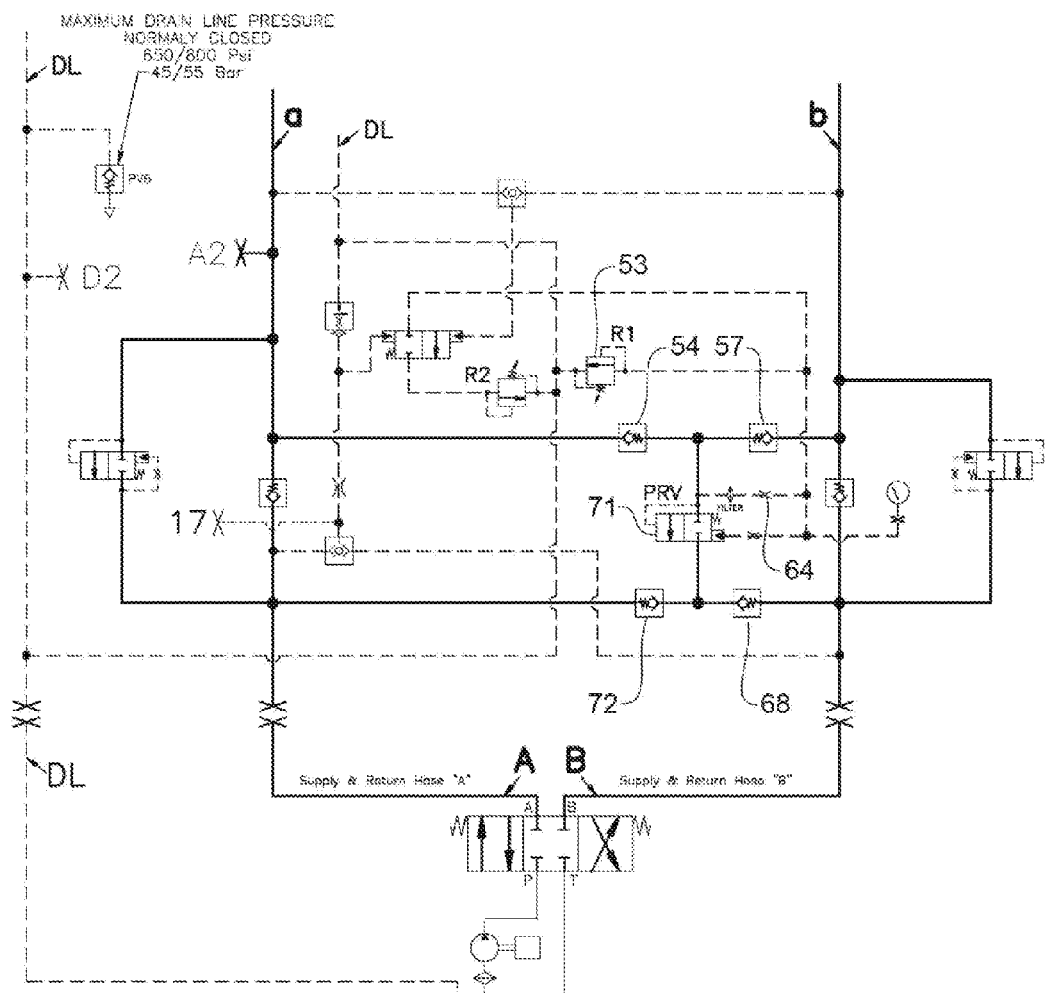
FIG. 6 shows a section of the hydraulic motor circuit illustrating the maximum system pressure relief circuit and the inertia resistance load relief circuit.
Figure 7:
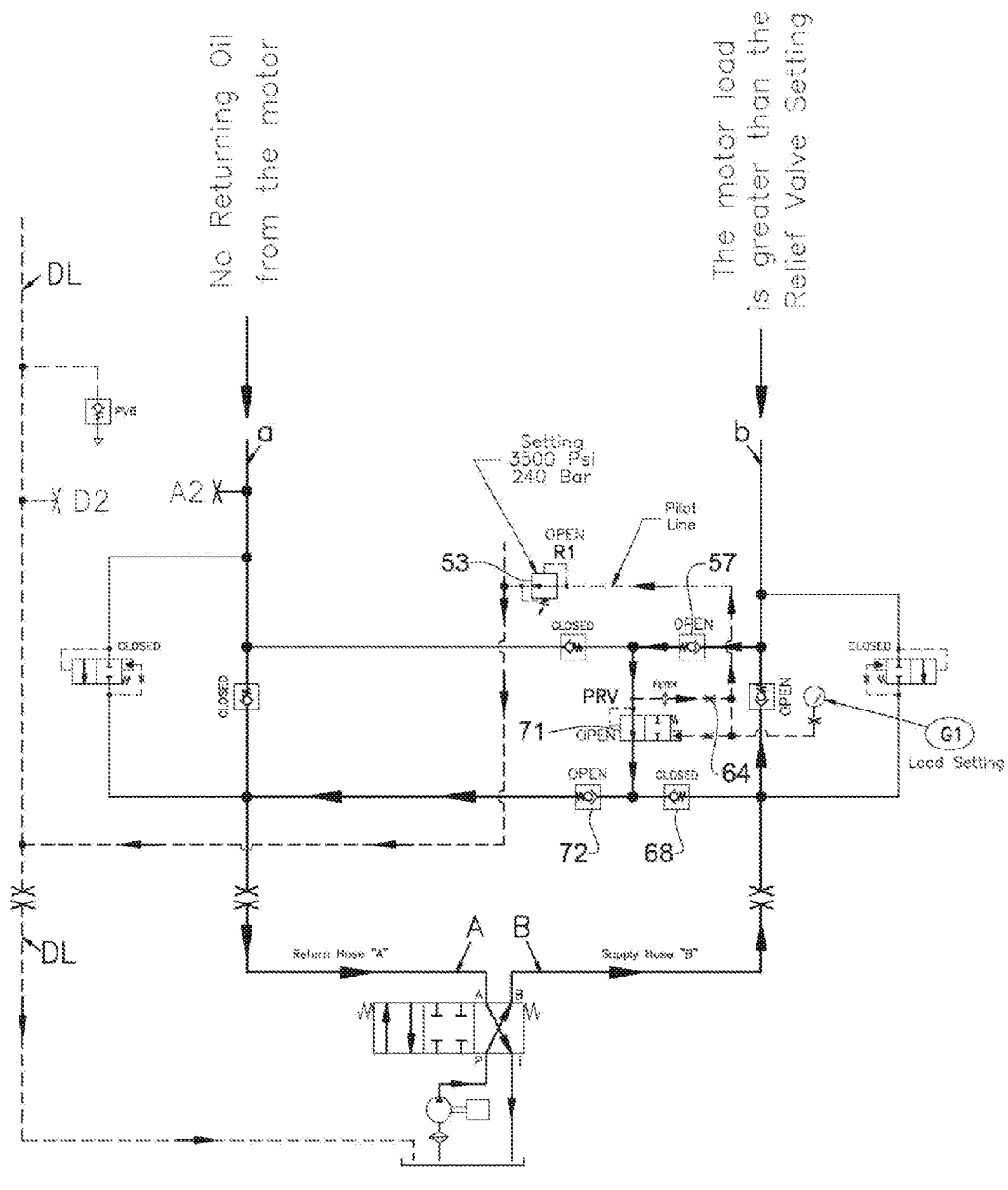
FIG. 7 shows the maximum system pressure relief circuit in operation when the motor load is greater than the setting of the second pilot stage relief valve setting and there is no returning oil from the motor.

Now referring to FIG. 6, there is shown a section of the hydraulic motor circuit illustrating the maximum system pressure relief circuit logic and the inertia resistance load relief circuit logic. FIG. 7 provides detail of the maximum system pressure relief circuit with the DCV directing supply flow to the B port of the hydraulic manifold. In FIG. 7, the motor load is greater than the maximum system pressure allowable which results in pressure building up on the supply side of the circuit while there is no returning oil from the motor. The pressure on the return side of the circuit therefore decreases. The maximum working pressure in the circuit is set by a pilot stage relief valve 53 which will open when pressure at its inlet port reaches 240 bar. The supply side of the circuit is also in fluid communication with a main stage pressure relief valve 71. The main stage relief valve 71 relieves pressure by allowing return flow through the lowest pressure (return) side A or B (the lowest pressure return side in FIG. 7 is the B side). FIG. 7 shows supply flow passing check valve 57, then passing through the main stage pressure relief valve 71 and through check valve 72 to return to the lower pressure B side of the circuit. In this way, the pressure in the supply side is relieved by allowing it to bypass the motor and return back through the DCV to the reservoir. The circuit logic works in both forward and reverse directions (i.e. the supply side could be the A or B side). In other embodiments, flow may be diverted from the supply line to the return line and back to the motor.

Pressure at the inlet to the main stage pressure relief valve 71 is communicated through orifice 64 simultaneously to the pilot port of the main stage pressure relief valve 71. When the system pressure is less than the maximum working pressure, the pilot stage relief valve 53 remains closed and the pressure at the inlet port of the main stage pressure relief valve 71 is the same as the pressure at the pilot port of the main stage pressure relief valve 71. However, if the pressure builds to 240 bar, then the pilot stage relief valve 53 will open and allow some oil to flow across orifice 64, through the pilot stage relief valve 53 to the reservoir. This creates a pressure drop across orifice 64 resulting in lower pressure acting on the pilot port of the main stage pressure relief valve 71 than on the inlet port of the main stage pressure relief valve 71. The main stage pressure relief valve 71 then pilots open allowing the flow from the high pressure supply side to return to the reservoir via the low pressure return side. In this way, supply is diverted from the supply line to the return line and pressure in the supply line is regulated so as not to exceed the maximum working pressure of the circuit.

When drilling, especially in high speed mode, the auger/drill will exert a high inertia load on the drilling mechanism if stopped or reversed abruptly. The hydraulic motor circuit provides means for absorbing this inertia in order to protect the drilling mechanism. Importantly, the circuit provides means for absorbing the inertia for an open centre or closed centre system as the hydraulic motor circuit may be connected to the hydraulic system of any piece of portable or mobile machinery. When a closed centre directional control valve is used (as shown), when placed in its neutral position (to stop the motor), the supply and return lines are blocked which will result in pressure in the return line increasing as the oil has nowhere to go.

Figure 8:
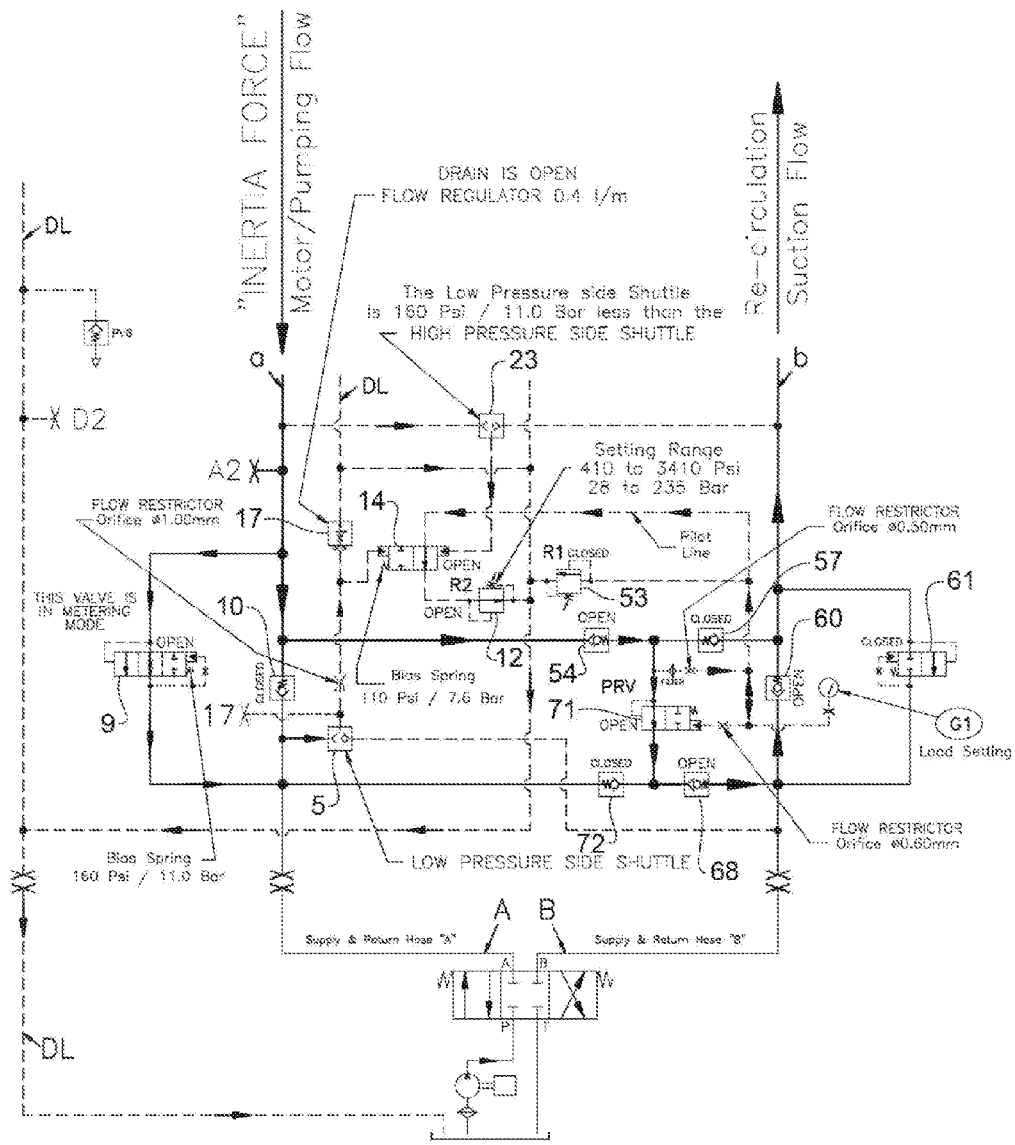
FIG. 8 shows the inertia resistance load relief circuit in operation with the inertia load on the motor causing the motor to act like a pump.

As shown in FIGS. 6 and 8, a further pilot stage relief valve 12 is provided. Pilot stage relief valve 12 allows an adjustable lower pressure setting for the motor's deceleration and (inertia) resistance in both the forward and reverse modes when the motor is suddenly shut down. The setting range of the pilot stage relief valve 12 is between 28-235 bar or as required with an alternative relief cartridge valve. Pilot stage relief valve 12 is set at a lower pressure than pilot stage relief valve 53 which is used to control the maximum working pressure. Under normal operation, when pressure in the supply line exceeds pressure in the return line, the pilot stage relief valve 12 is isolated from the main relief stage pilot 55 via control valve 14 which is a spool valve. Spool valve 14 is therefore configured to normally block flow to the pilot stage relief valve 12. Spool valve 14 includes an inlet and outlet, a pilot port and a spring chamber having a bias spring, said spring chamber directed to a further port, wherein the spool shifts open to allow flow between the inlet and outlet when pressure at the pilot port exceeds pressure at the further port which includes the bias spring pressure. The spring chamber (further port) of spool valve 14 is connected through a first shuttle valve 23 to both the A and B side of the circuit between the DCV and valves 9, 10 and 60, 61. The first shuttle valve 23 has a first inlet in fluid communication with the supply line, a second inlet in fluid communication with the return line and an outlet directing flow to the further port (spring chamber) of the spool valve 14. The spring chamber of valve 14 is also drained to the reservoir through the 0.4 l/m pressure compensated flow regulator valve 17. The pilot port of spool valve 14 is connected through shuttle valve 5 to both the A and B side of the circuit between valves 9, 10, 60, 61 and the motor. The second shuttle valve 5 has a first inlet in fluid communication with the supply line, a second inlet in fluid communication with the return line and an outlet directing flow to the pilot port of the spool valve 14.

When the pressure in the supply line exceeds the pressure in the return line, the shuttle valves 5, 23 are connected to the supply line and the spool valve 14 remains closed whereas when the pressure in the return line exceeds the pressure in the supply line, the shuttle valves 5, 23 connect to the return line thereby causing the spool valve 14 to shift open.

During a drilling operation, spool valve 14 remains closed thereby isolating the pilot stage relief valve 12 from the main relief stage pilot 55. The fluid pressure on the spring chamber (further port) of spool valve 14 will be slightly higher than the pressure at the pilot port of spool valve 14 (due to check valves 10 or 60). In an embodiment, spool valve 14 has a bias spring value of 7.6 bar which combined with the slight pressure differential ensures that spool valve 14 remains normally closed. As the DCV shifts to either stop or reverse the flow, the inertia of the auger/drill puts a load on the motor and causes the motor to act like a pump. The pressure on the return side of the circuit rises rapidly while the pressure on the supply side falls. As this happens, shuttle valves 5 and 23 shift to connect the spring chamber and pilot of spool valve 14 to the higher pressure return side. As return flow passes over logic element 9 (spring biased blocking valve), a pressure drop of 11 bar is imparted to the return flow. Consequently, the pressure on the pilot port of spool valve 14 exceeds the pressure at the spring chamber of spool valve 14 by 11 bar.

A first flow pressure upstream of logic element 9 is communicated to the pilot port of spool valve 14 while a second flow pressure downstream of logic element 9 is communicated to the spring chamber (further port) of the spool valve 14. The first flow pressure is 11 bar greater than the second flow pressure. This pressure differential set up in the return line is sufficient to overcome the 7.6 bar bias spring of spool valve 14 allowing it to shift open and expose the main relief stage pilot line 55 to the pilot stage relief valve 12. The main relief stage pilot line 55 communicates the pressure in the return line to the pilot stage relief valve 12. If the pressure in the return line is greater than the setting of the pilot stage relief valve 12, valve 12 will open and drain the main relief stage pilot to the reservoir. Opening of the pilot stage relief valve 12 causes the main stage pressure relief valve 71 to open, allowing flow to be diverted from the return line to the supply line and back to the motor. This recirculation flow relieves pressure and allows the motor to rundown smoothly when suddenly stopped/shutdown. The pilot stage relief valve 12 will remain open until the inertia load on the motor has reduced sufficiently to cause the pressure to fall below the setting of the pilot stage relief valve 12. Once the motor comes to a full stop, the pressure at the pilot port and spring chamber (further port) of spool valve 14 equalise, allowing spool valve 14 to close under the force of the bias spring. Flow regulator valve 17 ensures that there is always flow over logic elements 9 and 61 to maintain the 11 bar pressure differential between the pilot port and spring chamber (further port) of spool valve 14.

Spool valve 14 therefore allows the circuit to switch between monitoring maximum working pressure in the supply line and inertia resistance pressure in the return line.

Figure 10:
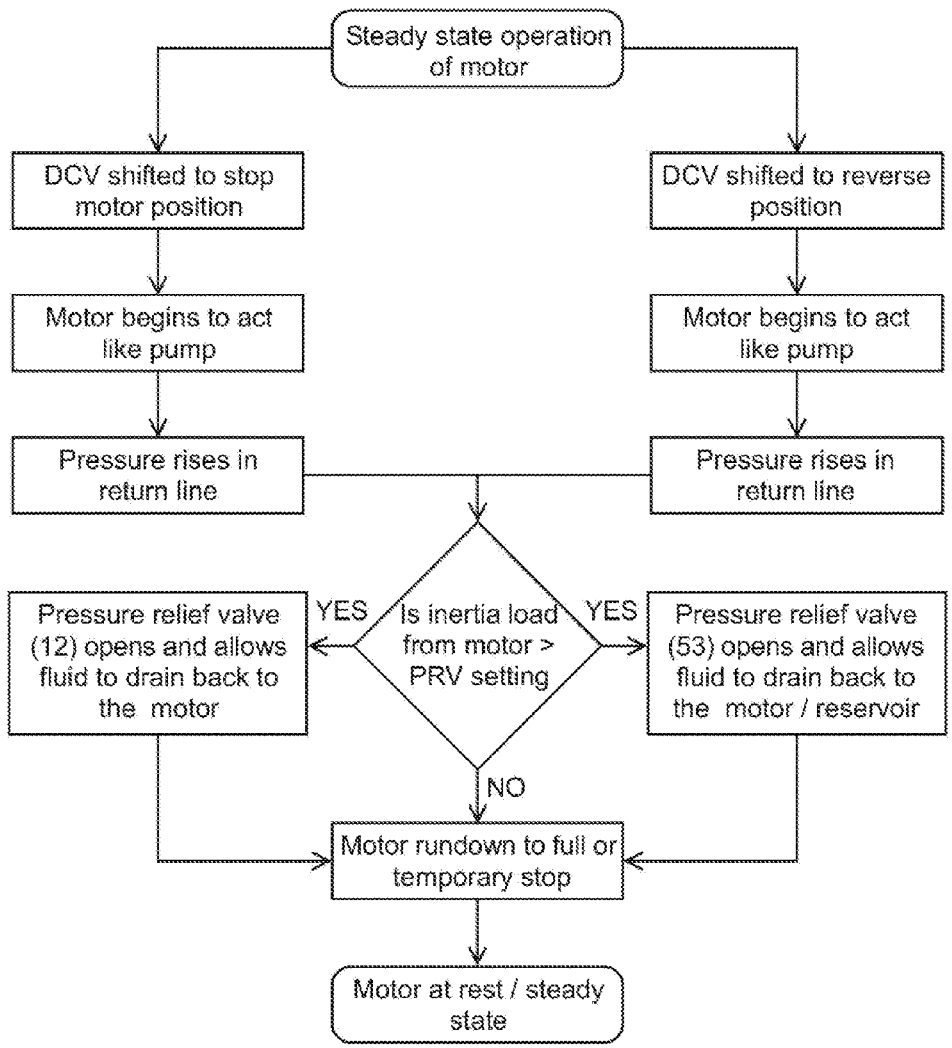
FIG. 10 shows a basic flow diagram of the method of absorbing an inertia load acting on the motor when the motor.

Now referring to FIG. 10, there is shown a flow diagram of the circuit logic used when the motor is suddenly shutdown or when the direction of rotation of the motor is reversed. The motor begins in a steady state running in forward or reverse. The DCV is then shifted by an operator to either stop the motor or change the direction of rotation. For the case of the motor being suddenly stopped, the inertia load of the auger acting on the motor causes the motor to act like a pump which causes the pressure in the return line to rise rapidly while the pressure in the supply line falls. If the inertia load is greater than the allowable inertia load of the circuit, the pilot stage relief valve 12 opens which causes the main stage pressure relief valve 71 to open, thereby allowing flow to be diverted from the return line to the supply line and back to the motor which allows the pressure in the return line to fall and the inertia load to be absorbed. The motor then winds down to a full stop. For the case of the motor changing direction of rotation by shifting the DCV into reverse, the motor begins to act like a pump and pressure in the return line (becoming the new supply line) increases concurrently with a pressure increase due to new flow being pumped through the DCV. For a brief period, old returning flow is directed towards new supply flow and the total pressure is equal to the sum of pressure from both flows. If this pressure is greater than the maximum working pressure, the pilot stage relief valve 53 will open. This causes the main stage relief valve 71 to open thereby allowing flow to be diverted from the (new) supply line to the return line and to the reservoir/motor. The circuit therefore ensures that when the direction of rotation of the motor is suddenly reversed, the circuit pressure remains below the maximum working pressure. When the direction of rotation is reversed, there is no motor rundown as occurs when the motor is suddenly stopped.

Figure 9:
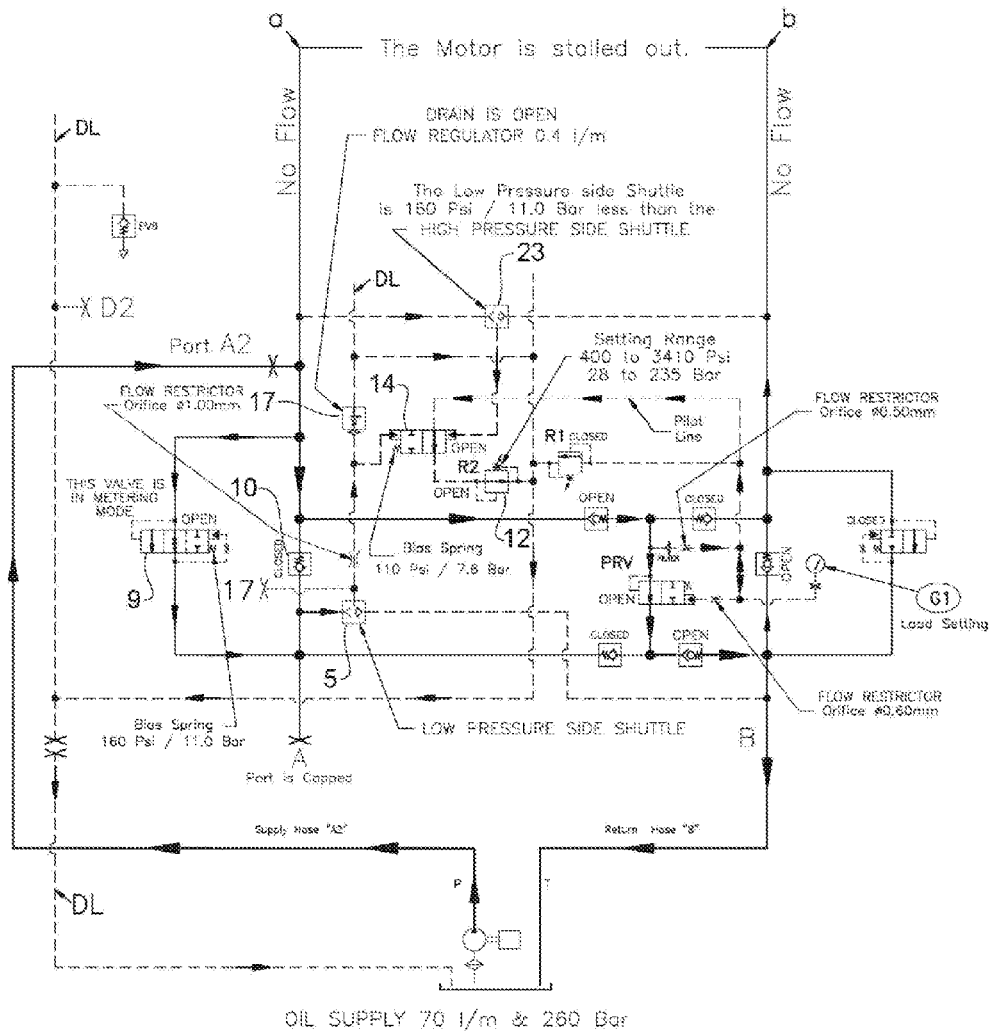
FIG. 9 is a section of the hydraulic motor circuit illustrating how the first pilot stage relief valve is set.

Referring briefly now to FIG. 9 there is shown a section of the hydraulic motor circuit illustrating how the inertia resistance load relief valve 12 is set. The A port is blocked and oil is introduced to Port A2 at 70 l/m and at a pressure of 260 bar. The oil returns to tank through the B port. By adjusting the value of the pilot stage relief valve 12 and reading the load setting on gauge G1, the load resistance can be adjusted to the required loading.

The hydraulic circuit of the present invention advantageously enables an inertia load acting on a bi-directional hydraulic motor to be absorbed to prevent overrun and potential damage to the hydraulic equipment. The circuit also provides means to monitor the maximum working pressure and the ability to switch between monitoring the maximum working pressure and monitoring an inertia resistance pressure to enable the motor to rundown to a stop when shutdown. Advantageously, the hydraulic circuit of the present invention further avoids the need to use inefficient counterbalance valves.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A hydraulic motor circuit for an auger, including:
   a hydraulic motor that receives oil from an oil supply via a supply line and returns oil to the oil supply via a return line;
   a main stage pressure relief valve;
   a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor; and
   a control valve configured to block flow to the first pilot stage relief valve when pressure in the supply line is greater than pressure in the return line;
   wherein, if pressure in the return line exceeds pressure in the supply line, the control valve shifts open and exposes the first pilot stage relief valve to pressure in the return line.

2. The hydraulic motor circuit according to claim 1 wherein the control valve shifts open due to a pressure differential set up in the return line.

3. The hydraulic motor circuit according to claim 2 wherein the control valve is a spool valve including an inlet and outlet, a pilot port and a spring chamber having a bias spring, said spring chamber directed to a further port, wherein the spool shifts open to allow flow between the inlet and outlet when pressure at the pilot port exceeds pressure at the further port which includes the bias spring pressure.

4. The hydraulic motor circuit according to claim 3 wherein oil in the return line flows through a spring-biased blocking valve wherein a first flow pressure upstream of the blocking valve is communicated to the pilot port of the spool valve and a second flow pressure downstream of the blocking valve is communicated to the further port of the spool valve, the first flow pressure exceeding the second flow pressure by at least the value of the bias spring pressure of the spool valve.

5. The hydraulic motor circuit according to claim 1 wherein the first pilot stage relief valve is set to open at a predetermined value selected from within the range 28 to 235 bar.

6. The hydraulic motor circuit according to claim 3 further including a second pilot stage relief valve openable if pressure in the supply line exceeds a maximum working pressure, opening of the second pilot stage relief valve causing the main stage pressure relief valve to open, allowing flow to be diverted from the supply line to the return line.

7. The hydraulic motor circuit according to claim 6 further including:
   a first shuttle valve having a first inlet in fluid communication with the supply line, a second inlet in fluid communication with the return line and an outlet directing flow to the further port of the spool valve; and
   a second shuttle valve having a first inlet in fluid communication with the supply line, a second inlet in fluid communication with the return line and an outlet directing flow to the pilot port of the spool valve;

wherein, when the pressure in the supply line exceeds the pressure in the return line, the first and second shuttle valves are connected to the supply line and the spool valve remains closed whereas when the pressure in the return line exceeds the pressure in the supply line, the first and second shuttle valves connect to the return line thereby causing the spool valve to shift open.

8. The hydraulic motor circuit according to claim 7 wherein the spool valve allows the circuit to switch between monitoring maximum working pressure in the supply line and inertia resistance pressure in the return line.

9. The hydraulic motor circuit according to claim 6 wherein the second pilot stage relief valve is set to open at 240 bar.

10. The hydraulic motor circuit according to claim 1 wherein the hydraulic motor is bi-directional.

11. The hydraulic motor circuit according to claim 1 wherein the circuit is adapted for use with either an open or closed centre hydraulic system associated with equipment that the auger is attached to.

12. The hydraulic motor circuit according to claim 1 further including:
    a first solenoid valve having a 12V DC coil; and
    a second solenoid valve having a 24V DC coil;
    wherein, the first or second solenoid valves are remotely actuated by applying either 12V DC or 24V DC to the respective coils, the actuation of either valve causing the speed of the hydraulic motor to change from a first speed to a second speed.

13. A hydraulic motor circuit for driving an auger, including:
    a bi-directional hydraulic motor that receives oil from an oil supply via a supply line and returns oil to the oil supply via a return line;
    a main stage pressure relief valve;
    a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor;
    a second pilot stage relief valve openable if pressure in the supply line exceeds a maximum working pressure, opening of the second pilot stage relief valve causing the main stage pressure relief valve to open, allowing flow to be diverted from the supply line to the return line; and
    a spool valve configured to block flow to the first pilot stage relief valve when pressure in the supply line is greater than pressure in the return line,
    wherein, a pressure differential set up in the return line is used to open the spool valve when pressure in the return line exceeds pressure in the supply line thereby exposing the first pilot stage relief valve to pressure in the return line and enabling an inertia load acting on the motor to be absorbed.

14. A drilling apparatus, including:
    an auger for performing a drilling operation; and
    a hydraulic motor circuit for driving said auger, said circuit adapted for use with either an open or closed centre hydraulic system associated with equipment that the auger is attached to, the hydraulic motor circuit including:
    a hydraulic motor that receives oil from the hydraulic system via a supply line and returns oil to the hydraulic system via a return line;
    a main stage pressure relief valve;
    a first pilot stage relief valve openable if pressure in the return line exceeds a predetermined value corresponding to an allowable inertia load acting on the motor, opening of the first pilot stage relief valve causing the main stage pressure relief valve to open, allowing flow to be diverted from the return line to the supply line and back to the motor; and
    a control valve configured to block flow to the first pilot stage relief valve when pressure in the supply line is greater than pressure in the return line;
    wherein, if pressure in the return line exceeds pressure in the supply line, the control valve shifts open and exposes the first pilot stage relief valve to pressure in the return line.

* * * * *